United States Patent
Rajpara

(10) Patent No.: US 10,095,747 B1
(45) Date of Patent: Oct. 9, 2018

(54) SIMILAR DOCUMENT IDENTIFICATION USING ARTIFICIAL INTELLIGENCE

(71) Applicant: @Legal Discovery LLC, Falls Church, VA (US)

(72) Inventor: Vishalkumar Rajpara, Ashburn, VA (US)

(*) Notice: Subject to any disclaimer, the term of this patent is extended or adjusted under 35 U.S.C. 154(b) by 369 days.

(21) Appl. No.: 15/174,135

(22) Filed: Jun. 6, 2016

(51) Int. Cl.
*G06F 17/30* (2006.01)
*G06F 17/27* (2006.01)
*G06N 5/04* (2006.01)
*G06N 99/00* (2010.01)

(52) U.S. Cl.
CPC .... *G06F 17/30528* (2013.01); *G06F 17/2705* (2013.01); *G06F 17/2785* (2013.01); *G06F 17/30011* (2013.01); *G06F 17/30554* (2013.01); *G06N 5/047* (2013.01); *G06N 99/005* (2013.01)

(58) Field of Classification Search
CPC ......... G06F 17/30528; G06F 17/30011; G06F 17/2785; G06F 17/30554; G06F 17/2705; G06N 5/047
See application file for complete search history.

(56) References Cited

U.S. PATENT DOCUMENTS

| | | | |
|---|---|---|---|
| 6,985,898 B1 | 1/2006 | Ripley et al. | |
| 7,271,804 B2 | 9/2007 | Evans | |
| 7,844,566 B2 | 11/2010 | Wnek | |
| 8,165,974 B2 | 4/2012 | Privault et al. | |
| 8,175,377 B2 | 5/2012 | Moore et al. | |
| 8,276,060 B2 | 9/2012 | Hong et al. | |
| 8,538,184 B2 | 9/2013 | Neogi et al. | |
| 8,612,446 B2 | 12/2013 | Knight et al. | |
| 8,838,606 B1 | 9/2014 | Cormack et al. | |
| 8,880,492 B2 * | 11/2014 | Kumar | G06F 17/30719 707/706 |
| 8,977,620 B1 | 3/2015 | Buryak et al. | |
| 9,043,356 B2 | 5/2015 | Bao et al. | |
| 9,075,498 B1 | 7/2015 | Wiggins et al. | |
| 9,165,062 B2 | 10/2015 | Knight | |
| 9,195,399 B2 | 11/2015 | Gallivan et al. | |
| 9,202,249 B1 * | 12/2015 | Cohen | G06Q 40/12 |

(Continued)

OTHER PUBLICATIONS

Grossman, et al., "Technology-Assisted review in E-Discovery Can Be More Effective and More Efficient Than Exhaustive Manual Review", Richmond Journal of Law and Technology, vol. XVII, Issue 3, 2011, 33 pages.

*Primary Examiner* — Leslie Wong
(74) *Attorney, Agent, or Firm* — IP Spring

(57) ABSTRACT

Implementations generally relate to processing similar documents. In some implementations, a method includes receiving a plurality of documents related to e-discovery. The method further includes determining a seed document from the plurality of documents. The method further includes receiving a search request to search at least one selection of text in the seed document. The method further includes identifying other documents from the plurality of documents based on a similarity between text in the other documents and the at least one selection of text in the seed document. The method further includes generating a graphical user interface that includes a similarity panel that provides similarity data between text in the other documents and the at least one selection of text in the seed document.

20 Claims, 10 Drawing Sheets

(56) References Cited

U.S. PATENT DOCUMENTS

| | | | |
|---|---|---|---|
| 9,208,219 B2 | 12/2015 | Sperling et al. | |
| 9,235,573 B2 | 1/2016 | Danielyan et al. | |
| 2004/0193584 A1* | 9/2004 | Ogawa | G06F 17/30675 |
| 2005/0138056 A1* | 6/2005 | Stefik | G06F 17/30011 |
| 2005/0203924 A1* | 9/2005 | Rosenberg | G06F 17/30696 |
| 2007/0043774 A1* | 2/2007 | Davis | G06K 9/6254 |
| 2008/0162455 A1* | 7/2008 | Daga | G06F 17/30616 |
| 2009/0287668 A1* | 11/2009 | Evans | G06F 17/3071 |
| 2010/0049684 A1* | 2/2010 | Adriaansen | G06F 17/27 |
| | | | 706/46 |
| 2010/0332520 A1* | 12/2010 | Lu | G06F 17/30722 |
| | | | 707/769 |
| 2011/0029526 A1* | 2/2011 | Knight | G06F 17/30713 |
| | | | 707/737 |
| 2012/0078613 A1* | 3/2012 | Kandekar | G06F 17/2745 |
| | | | 704/9 |
| 2013/0054612 A1 | 2/2013 | Danielyan et al. | |
| 2013/0144875 A1* | 6/2013 | Hagiwara | G06F 17/3053 |
| | | | 707/731 |
| 2015/0039581 A1* | 2/2015 | John | G06F 17/30722 |
| | | | 707/706 |
| 2015/0220539 A1 | 8/2015 | Lambert et al. | |
| 2015/0278197 A1* | 10/2015 | Bogdanova | G06F 17/2785 |
| | | | 704/9 |
| 2017/0039176 A1* | 2/2017 | Broderick | G06F 17/24 |
| 2017/0330115 A1* | 11/2017 | Hankins | G06Q 10/10 |

\* cited by examiner

Seed Document

Other Documents

| Document ID: | DocID1 | | |
|---|---|---|---|
| Document Title: | DocTitle | | |
| File Type: | .doc | | |
| Custodian: | UserName | | |
| Rank | DocID | File Ext. | Similarity |
| 1 | DocID1 | .doc | 100 |
| 2 | DocID2 | .doc | 75.45 |
| 3 | DocID3 | .doc | 75.45 |
| 4 | DocID4 | .doc | 38.18 |

800

SIMILAR DOCUMENT IDENTIFICATION USING ARTIFICIAL INTELLIGENCE

BACKGROUND

Document searches are used in a variety of applications. For example, document searches are typically used in legal discovery during a lawsuit. During legal discovery, a user may need to search documents, read the documents, and then identify those documents that contain particular text that would be useful in a lawsuit. Such a discovery process can be time consuming due to potentially thousands of documents that need to be searched, reviewed, and identified.

SUMMARY

Implementations generally relate to processing similar documents. In some implementations, a method includes receiving a plurality of documents related to e-discovery. The method further includes determining a seed document from the plurality of documents. The method further includes receiving a search request to search at least one selection of text in the seed document. The method further includes identifying other documents from the plurality of documents based on a similarity between text in the other documents and the at least one selection of text in the seed document. The method further includes generating a graphical user interface that includes a similarity panel that provides similarity data between text in the other documents and the at least one selection of text in the seed document. In some implementations, the similarity panel provides a first number of the other documents having text that is identical to the at least one selection of text in the seed document based on a first predetermined similarity threshold. In some implementations, the similarity panel provides a second number of the other documents having text that is similar to the at least one selection of text in the seed document based on a second predetermined similarity threshold. In some implementations, the similarity panel provides an option to search for a subset of the other documents based on a similarity percentage between the at least one selection of text in the seed document and text in the other documents.

With further regard to the method, in some implementations, the method further includes receiving a similarity request to identify the other documents having text that is similar to the at least one selection of text in the seed document, and identifying the other documents having text that is similar to the at least one selection of text in the seed document. In some implementations, the identifying of the other documents is based on the similarity between the at least one selection of text in the seed document and text in the other documents which includes using pattern recognition. In some implementations, the graphical user interface includes a list of one or more legal issues to associate with any one or more documents of the plurality of documents. In some implementations, the method further includes associating one or more legal issues with the seed document, associating one or more other documents with the one or more legal issues associated with the seed document, receiving a filter request that includes the one or more legal issues, and filtering one or more other documents from the plurality of documents based on the filter request. In some implementations, the graphical user interface includes, for each document of the plurality of documents, an option to view each document of the plurality of documents in a native format, a graphical format, a text format, a production format, a translated format, or an original format. In some implementations, the method further includes enabling a user to redact one or more portions of the seed document, and automatically redacting one or more corresponding portions of one or more other documents.

In some embodiments, a computer-readable storage medium carries one or more sequences of instructions thereon. When executed by one or more processors, the instructions cause the one or more processors to perform operations including receiving a plurality of documents related to e-discovery. The instructions when executed further cause the processor to perform operations including determining a seed document from the plurality of documents. The instructions when executed further cause the processor to perform operations including receiving a search request to search at least one selection of text in the seed document. The instructions when executed further cause the processor to perform operations including identifying other documents from the plurality of documents based on a similarity between text in the other documents and the at least one selection of text in the seed document. The instructions when executed further cause the processor to perform operations including generating a graphical user interface that includes a similarity panel that provides similarity data between text in the other documents and the at least one selection of text in the seed document. In some implementations, the similarity panel provides a first number of the other documents having text that is identical to the at least one selection of text in the seed document based on a first predetermined similarity threshold. In some implementations, the similarity panel provides a second number of the other documents having text that is similar to the at least one selection of text in the seed document based on a second predetermined similarity threshold. In some implementations, the similarity panel provides an option to search for a subset of the other documents based on a similarity percentage between the at least one selection of text in the seed document and text in the other documents.

With further regard to the computer-readable storage medium, in some implementations, the instructions when executed further cause the one or more processors to perform operations including receiving a similarity request to identify the other documents having text that is similar to the at least one selection of text in the seed document, and identifying the other documents having text that is similar to the at least one selection of text in the seed document. In some implementations, the identifying of the other documents is based on the similarity between the at least one selection of text in the seed document and text in the other documents which includes using pattern recognition. In some implementations, the graphical user interface includes a list of one or more legal issues to associate with any one or more documents of the plurality of documents. In some implementations, the instructions when executed further cause the one or more processors to perform operations including associating one or more legal issues with the seed document, receiving a filter request that includes the one or more legal issues, and filtering one or more other documents from the plurality of documents based on the filter request. In some implementations, the graphical user interface includes, for each document of the plurality of documents, an option to view each document of the plurality of documents in a native format, a graphical format, a text format, a production format, a translated format, or an original format. In some implementations, the instructions when executed further cause the one or more processors to perform operations including enabling a user to redact one or more portions of the seed document, and automatically redacting one or more corresponding portions of one or more other documents.

In some implementations, a system includes one or more processors, and includes logic encoded in one or more tangible media for execution by the one or more processors. When executed, the logic is operable to perform operations including receiving a plurality of documents related to e-discovery. The logic when executed further cause the processor to perform operations including determining a seed document from the plurality of documents. The logic when executed further cause the processor to perform operations including receiving a search request to search at least one selection of text in the seed document. The logic when executed further cause the processor to perform operations including identifying other documents from the plurality of documents based on a similarity between text in the other documents and the at least one selection of text in the seed document. The logic when executed further cause the processor to perform operations including generating a graphical user interface that includes a similarity panel that provides similarity data between text in the other documents and the at least one selection of text in the seed document. In some implementations, the similarity panel provides a first number of the other documents having text that is identical to the at least one selection of text in the seed document based on a first predetermined similarity threshold. In some implementations, the similarity panel provides a second number of the other documents having text that is similar to the at least one selection of text in the seed document based on a second predetermined similarity threshold. In some implementations, the similarity panel provides an option to search for a subset of the other documents based on a similarity percentage between the at least one selection of text in the seed document and text in the other documents.

With further regard to the system, in some implementations, the logic when executed is further operable to perform operations including receiving a similarity request to identify the other documents having text that is similar to the at least one selection of text in the seed document, and identifying the other documents having text that is similar to the at least one selection of text in the seed document. In some implementations, the identifying of the other documents is based on the similarity between the at least one selection of text in the seed document and text in the other documents which includes using pattern recognition. In some implementations, the graphical user interface includes a list of one or more legal issues to associate with any one or more documents of the plurality of documents. In some implementations, the logic when executed is further operable to perform operations including associating one or more legal issues with the seed document, receiving a filter request that includes the one or more legal issues, and filtering one or more other documents from the plurality of documents based on the filter request.

BRIEF DESCRIPTION OF THE DRAWINGS

FIG. 5 illustrates example user interface displaying document search results, according to some implementations.

DETAILED DESCRIPTION

Implementations generally relate to processing similar documents. In some implementations, a method includes receiving a plurality of documents related to e-discovery. The method further includes determining a seed document from the plurality of documents. The method further includes receiving a search request to search at least one selection of text in the seed document. The method further includes identifying other documents from the plurality of documents based on a similarity between text in the other documents and the at least one selection of text in the seed document. The method further includes generating a graphical user interface that includes a similarity panel that provides similarity data between text in the other documents and the at least one selection of text in the seed document. In some implementations, the similarity panel provides a first number of the other documents having text that is identical to the at least one selection of text in the seed document based on a first predetermined similarity threshold. In some implementations, the similarity panel provides a second number of the other documents having text that is similar to the at least one selection of text in the seed document based on a second predetermined similarity threshold. In some implementations, the similarity panel provides an option to search for a subset of the other documents based on a similarity percentage between the at least one selection of text in the seed document and text in the other documents.

Other implementations generally relate to providing document analytics. In some implementations, a method includes receiving a plurality of documents related to e-discovery. The method further includes generating a graphical user interface that includes an analytics panel that provides analytics information about the plurality of documents. The method further includes receiving, from one or more users, manual tags for one or more documents of the plurality of documents. The method further includes performing a first iteration that determines a first group of documents that are improperly associated with one or more of the manual tags based on at least one of content and metadata of the plurality of documents. The method further includes generating a report that includes information about the first group of documents. The method further includes receiving, from the one or more users, a reclassification of one or more of the manual tags. The method further includes performing a second iteration that determines a second group of documents that are improperly associated with one or more of the manual tags based on the reclassification, where the first group of documents includes different manual tags from the second group of documents. The method further includes updating the report to include information about the second group of documents.

Figure 1:
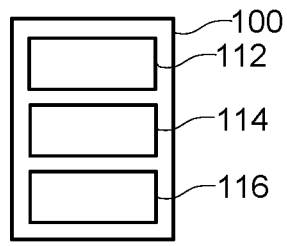
FIG. 1 illustrates a block diagram of an example seed document and other documents, according to some implementations.
Figure 1:
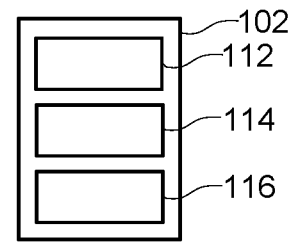
Figure 1:
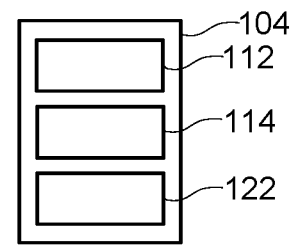
Figure 1:
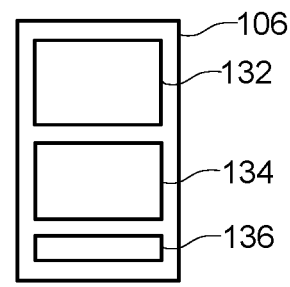

FIG. 1 illustrates a block diagram of an example seed document 100 and other documents 102, 104, and 106, according to some implementations. In various implementations, the system initially receives and stores documents in any suitable storage location. The system enables access to such documents for review, and/or creates batches of the documents for review. The system may group documents based on family (e.g., email attachments, date created, etc.), and/or create custom batches, where the custom batches may include near similar documents.

In some implementations, the system may produce different versions of the documents in different file formats. For example, the system may receive an original version of a file, which is designated at native. The system may convert the native file to one or more of a tagged image file format (TIFF), text, Hyper Text Markup Language (HTML), translated versions of the text, etc. In various implementations, an HTML file enables a user to redact portions of a document. Implementations directed to redacting are described in more detail herein. In some implementations, the system may apply field coding in order to associate code with each document.

As shown, document 100 includes sections 112, 114, and 116, each of which includes text. In various implementations described herein, document 100 is a seed document 100. In some implementations, a seed document is a document having reference text to which text from other documents are compared. As such, a seed document may be referred to as a reference document. In various implementations, the seed document may be user selected. In other implementations, the system may identify and suggest a seed document to the user.

The system may identify and suggest the seed document to the user based on artificial intelligence. For example, the system may use machine learning to identify different factors for suggesting the seed document, such as a type of court case being litigated, a type of document being used, keywords in a document, metadata, etc. The system may use a training set to identify the factors. For example, the system may determine that for contract cases the suggested seed document is an earliest version of a document that includes certain keywords, such as breach of contract.

The system may receive a request to search a selection of text in the seed document. In some implementations, the system may suggest the particular selection of text to the user, who may confirm the selection. The system may use artificial intelligence to suggest the particular selection of text. For example, for a breach of contract case, the system may suggest a section of a contract that details a payment schedule under the terms of the contract.

As described in more detail below, comparisons between text of the seed document and text of other documents may be applied to searches. Results from such searches may have various applications. For example, in some implementations, search results may include documents that have the same or similar content. In some implementations, search results may be used to automatically modify (e.g., redact) the same text across multiple documents.

Documents 102, 104, and 106 may be referred to as "other documents" in that they are not currently the seed document. In other words, the other documents are not currently selected to be a seed document. That said, in other scenarios, any given document (e.g., documents 102, 104, 106, etc.) may be selected to function as a seed document.

As shown, document 102 includes sections 112, 114, and 116. In various implementations, like reference numbers represent sections of identical text. For example, section 112 of document 100 and section 112 of document 102 are identical. Also, documents 100 and 102 are identical, because both documents 100 and 102 include the same sections 112, 114, and 116. Stated differently, documents 100 and 102 are 100% identical. As such, if section 112 of seed document 100 was selected for a search, document 102 would appear in the search results as having text (e.g., section 112 of document 102) that is 100% similar to section 112 of seed document 100. In fact, if any section of seed document 100 were selected for a search, document 102 would appear in the search results has having text (e.g., corresponding section of document 102) that is 100% similar to the selected section of seed document 100.

As described in more detail herein, other documents may be compared to the seed document in terms of percentage in similarity (e.g., 100% similar or identical, 99.9% similar, 10.7% similar, 0% similar, etc.). In the context of such percentages, the terms similar and identical may be used interchangeably. For example, whether two documents are referred to as 50% identical or 50% similar, 50% of portions of text in one document are identical to 50% of portions of text in the other document.

In various implementations, as described in more detail herein, the text (or sections of text) in other documents may be compared to a particular selected section of text in the seed document. In the context of the selected section of text in the seed document, sections of text in other documents may be characterized in terms of being similar and identical to the selected text of the seed document. Similar to the example previously described, in the context of percentages of similarity, a section of text in another document may be characterized as being similar to a particular degree, or by a particular percentage (e.g., 100% similar or identical, 99.9% similar, 10.7% similar, 0% similar, etc.) to selected text in the seed document.

As shown, document 104 includes sections 112, 114, and 122, where sections 112 and 114 are identical to those in seed document 100. In various implementations, different reference numbers represent sections of different text. For example, section 112 of document 100 and section 122 of document 104 are different. In other words, in this particular example implementation, section 122 is unique to document 104 and thus different from the sections of document 100. In this particular example, the entire document 104 is 81.3% similar to the entire seed document 100. Broken down by section, each of sections 112 and 114 of document 104 is 100% identical (or 100% similar) to each of respective sections 112 and 114 of seed document 100. As such, if section 112 of seed document 100 were selected for a search, document 104 would appear in the search results has having text (e.g., section 112 of document 104) that is 100% similar to section 112 of seed document 100. Also, section 122 of document 104 is 0% identical (or 0% similar) to any section of seed document 100. As such, if section 116 of seed document 100 were selected for a search, document 104 would not appear in the search results, because document 104 does not have any text that is similar to section 116 of seed document 100 (0% similarity).

It is possible for a given section of text of another document to be similar to a selected section of text in the seed document by a percentage between 0% and 100%. In such a scenario, the system may determine that percentage (e.g., 57.1%, etc.). Furthermore, in some implementations, the system may factor in the percentage of similarity of that section compared to the section of the selected text of the seed document into the percentage of similarity of the document.

As shown, document 106 includes sections 132, 134, and 136. In this particular implementation, sections 134 and 136 have no similarity or 0% similarity to any of the sections of seed document 100. As such, if section 112 of seed document 100 were selected for a search, document 106 would not appear in the search results, because document 106 wound not have any text that is similar to section 112 of seed document 100 (e.g., 0% similarity). In this particular example, section 132 has some similarity to section 112 of seed document 100. For example, section 132 is 57.1% similar to section 112 of seed document 100. As such, if section 112 of seed document 100 were selected for a search, document 106 would appear in the search results has having text that is 57.1% similar to section 112 of seed document 100.

For ease of illustration, FIG. 1 shows seed document 100 and other documents 102, 104, and 106, each having three sections. The actual number of sections may vary and will depend on the particular documents. For example, a given document may have any number of sections (e.g., 1, 2, 3, 4, 5, up to tens or hundreds of sections, etc.).

Furthermore, for ease of illustration, the sizes of the boxes in 106 representing the sections are shown as being different sizes. The size shown, however, is independent of the amount of text. For example, referring to seed document 100, section 112 could include more or less text than section 114 (e.g., twice as much, a third as much, etc.).

Furthermore, for ease of illustration, seed document 100 and other documents 102, 104, and 106 are shown having a single page. The actual number of pages per document may vary, and will depend on the particular implementation. For example, a given document may have any number of pages (e.g., 1, 2, 3, up to tens or hundreds of pages, etc.)

Furthermore, for ease of illustration, FIG. 1 shows, in addition to seed document 100, three other documents 102, 104, and 106. These documents 102, 104, and 106 may represent thousands of documents subject to being searched.

Figure 2:
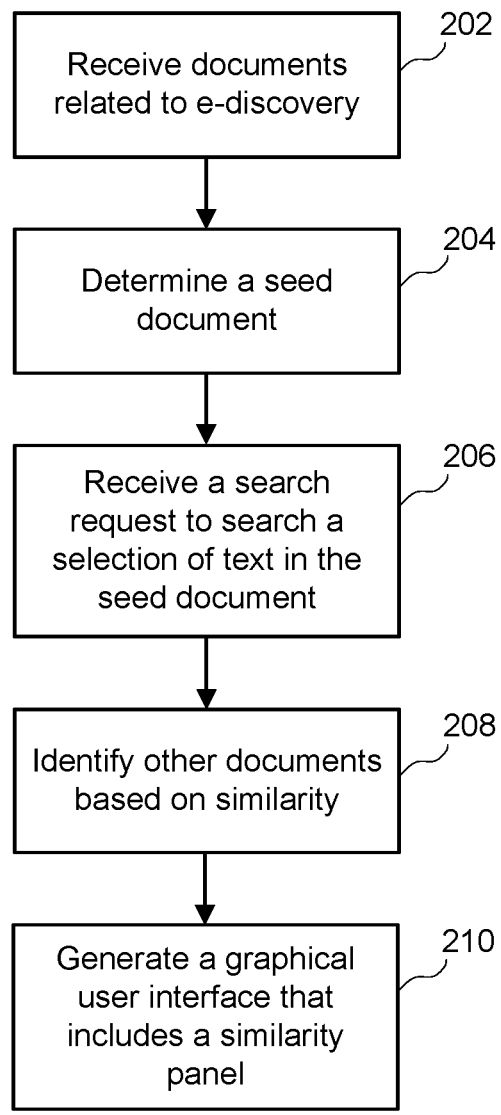
FIG. 2 illustrates an example flow diagram for processing documents, according to some implementations.

FIG. 2 illustrates an example flow diagram for processing documents, according to some implementations. In some implementations, the system performs best when the seed document includes about 10 to 200,000-400,000 words. Referring to FIGS. 1 and 2, a method is initiated at block 202, where the system receives documents related to e-discovery. For example, the documents may be owned by or otherwise associated with a party of a lawsuit, where the party may be an individual and/or a corporation and/or any legal entity such as a government organization. While implementations are described herein in the context of legal documents, these implementations and others may also apply to other types of documents.

At block 204, the system determines a seed document 100 from the documents. For example, the system may enable a user to select a particular seed document such as seed document 100, where the system determines the seed document based on the selection. In another example, the system may identify the particular seed document using artificial intelligence. While various implementations are described herein in the context of documents, such implementations and others may apply to emails.

At block 206, the system receives a search request to search a selection of text in seed document 100. In some implementations, the system uses artificial intelligence to suggest a particular selection of text for the user to select. For ease of illustration, various implementations are described in the context of a search request associated with a single selection of text in the seed document. These implementations and others may also apply to a search request associated with multiple selections of text in the seed document. In this particular example, the selected section of text of seed document 100 may be section 112, for example.

Figure 3:
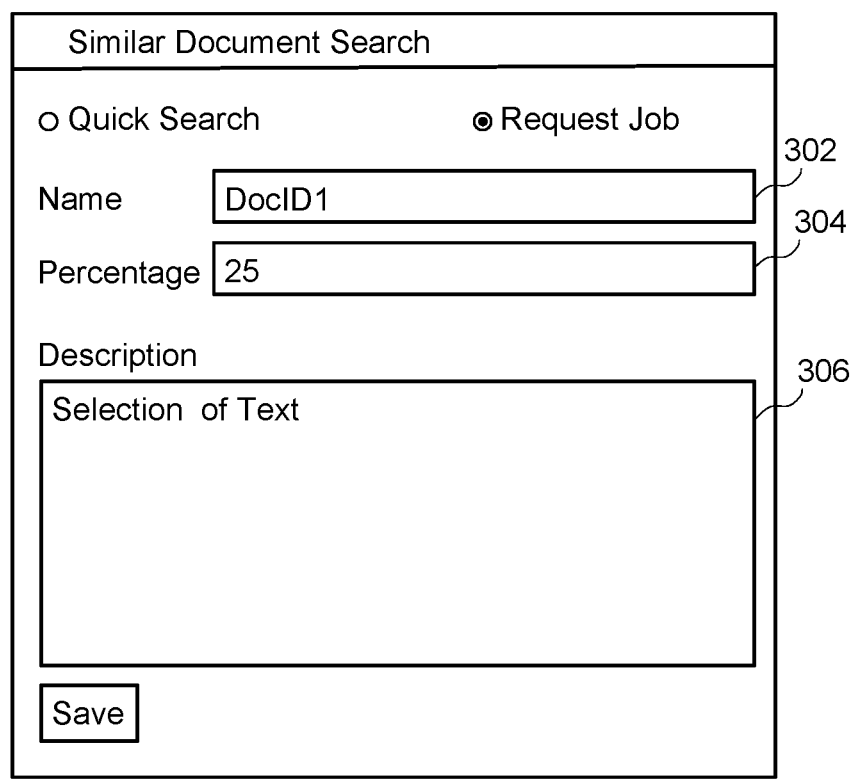
FIG. 3 illustrates example user interface displaying fields for a document search query, according to some implementations.

Turning to FIG. 3, an example user interface 300 is illustrated that includes fields for a document search query, according to some implementations. As shown, user interface 300, labeled "Similar Document Search," enables a user to initiate a search query. In this particular example, the system enables a user to enter the name or document identification of a seed document (e.g., document "DocID1") in a name field 302. Document DocID1 of FIG. 3 may correspond to seed document 100 of FIG. 1. The user may type in the name of any particular seed document.

As shown, the system enables a user to enter a number or percentage (e.g., 25, etc.) in a percentage field 304. In some implementations, the percentage may be a minimum percentage of similarity required for documents to be included in the search results. As such, the percentage may be referred to as a threshold percentage. For example, in some implementations, any document having text that meets or exceeds the threshold percentage will appear in the search results (e.g., having 25% of text similar to the selection of text in the seed document DocID1).

As shown, the system enables a user to enter a selection of text of the seed document in description field 306. For ease of illustration, that selection of text is labeled, "Selection of Text." In some implementations, the selection of text may be keywords. In some implementations, the system may enable the user to type in a selected section of text, cut and paste a selected section of text, or otherwise select a section of text by any other suitable means. The system may then allow the user to save the entered information. In some implementations, after the user saves the entered information, the system may then perform the search. In some implementations, the search may be associated with a search status that is viewable responsive to a user moving an indicator (e.g., a mouse) to hover over the name of the search. For example, if the user's mouse hovers over the name of the search, it may display a window that states "Status: complete."

In some implementations, the system may provide a graphical user interface that includes a list of one or more legal issues to associate with any one or more documents of the plurality of documents. For example, in some implementations, the system may provide a drop-down menu in the graphical user interface that lists legal issues that a user may select. In some implementations, the system may provide a text field in the graphical user interface that enables a user to enter legal issues in to the text field. In some implementations, description field 306 may be used as the text field into which a user can type in legal issues. In some implementations, the system may allow the user to save the similar document search with the name, percentage, and description including legal issues to help a user remember the context of the similarity search.

In some implementations, the system associates one or more legal issues with the seed document. The system may automatically associate the one or more legal issues with other documents that are similar to the seed document. For example, the system may associate the legal issue with other documents that have a similarity threshold that exceeds a predetermined value. The system may use artificial intelligence to associate the legal issue with the other documents. If the system receives a filter request that includes the one or more legal issues, the system may filter one or more other documents that are associated with the legal issues from the plurality of documents based on the filter request.

Turning back to FIG. 2, at block 208, the system identifies other documents from the received documents based on similarity between text in the other documents and the selection of text in the seed document. The system may identify documents 102, 104, and 106 as having text that is similar to selected text in the seed document. For example, such identification may be based on the similarity between text in the other documents 102, 104, and 106 (e.g., section 112 of documents 102 and 104, and section 132 of document 106) and the selection of text in the seed document (e.g., section 112 of seed document 100).

In this particular example, section 112 of documents 102 and 104 are 100% identical/similar to section 112 of seed document 100. As indicated above, based on section 112 of seed document 100 being the selected section, documents 102 and 104 would appear in the search results as having text that is 100% similar.

Also, in this particular implementation, section 132 of document 106 has some similarity to section 112 of seed document 100. In this particular example, section 132 of document 106 is 57.1% similar to section 112 of seed document 100. As indicated above, based on section 112 of the seed document being the selected section, document 106 would appear in the search results as having text that is 57.1% similar.

In some implementations, the system receives a similarity request to identify the other documents having text that is similar to the selection of text in the seed document. The system then identifies the other documents having text that is similar to the selection of text in the seed document. In various implementations, the system identifies such other documents using suitable techniques. For example, in some implementations, the system identifies the other documents based on the similarity between the selection of text in the seed document and text in the other documents which includes artificial intelligence, such as using pattern recognition.

The system may utilize such pattern recognition techniques to determine one or more keywords in the selected sections of text provided by a user and then search for those one or more keywords in each of the other documents. In some implementations, keywords may include particular phrases having legal meaning, such as phrases having legal terminology. For example, the keywords may include particular phrases, such as "bleaching contract" for a breach of contract case involving a contract for providing bleaching services. In some implementations, keywords may include particular sentences, where such sentences may include particular phrases having legal meaning, such as phrases having legal terminology. This facilitates a user in identifying issues pertaining to a given document.

In some implementations, the system may determine keywords that are used in pattern recognition based on machine learning. For example, the system may receive a training set of documents and information about significant keywords in the training set. The system may generate a model from the training set and apply the model to new data sets. This may be helpful in identifying documents where keywords are used in particular ways that have legal significance.

At block 210, the system generates a graphical user interface that includes a similarity panel. In various implementations, the similarity panel provides similarity data between text in the other documents and the selection of text in the seed document.

Figure 4:
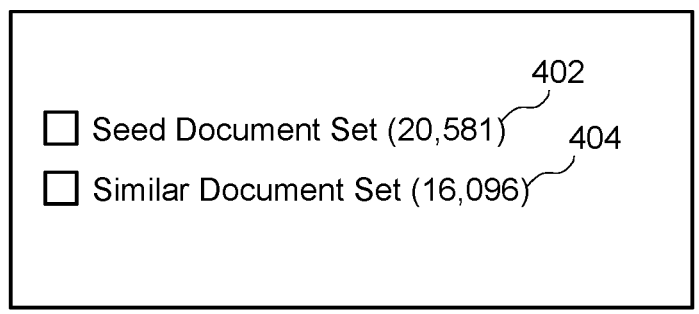
FIG. 4 illustrates example user interface displaying document search results, according to some implementations.

FIG. 4 illustrates example user interface 400 displaying document search results, according to some implementations. In various implementations, the similarity panel provides a first number of the other documents having text that is identical to the selection of text in the seed document based on a first predetermined similarity threshold. For example, as shown, in this particular example implementation, user interface 400 shows that the seed document set 402 has 20,581 documents that meet or exceed the threshold percentage of 100%.

In various implementations, the similarity panel also provides a second number of the other documents having text that is similar to the selection of text in the seed document based on a second predetermined similarity threshold. For example, in this particular example implementation, user interface 400 shows that there are 16,096 similar documents found in similar document set 404 that meet or exceed the threshold percentage selected or provided by a user.

In various implementations, the similarity panel also provides an option to search for a subset of the other documents based on a similarity percentage between the selection of text in the seed document and text in the other documents. For example, in this particular example implementation, based on user selection of either seed document set 402 or similar document set 404, the system displays a list of the respective document set, either seed document set 402 or similar document set 404.

FIG. 5 illustrates example user interface 500 displaying document search results, according to some implementations. As shown, in this particular implementation, user interface 500 includes information about the seed document such as document ID (e.g., DocID1), document title (e.g., DocTitle), file type (e.g., .doc), and custodian of the document (e.g., UserName).

As shown, user interface 500 displays a list of documents DocID, DocID1, DocID2, DocID3, DocID4, etc., which are ranked in order of similarity to the seed document. In some implementations, the actual seed document (e.g., DocID) is included in the list. Also shown is the file type or file extension (e.g., .doc) for each document listed. The system may rank the other documents based on similarity to the seed document that includes the similarity percentage or other factors, such as pattern recognition. For example, the system may perform pattern recognition, identify important keywords, and rank the other documents based on precedent of important keywords in the other documents.

For ease of illustration, four documents are shown. The actual number of documents may vary and will depend on the particular implementation. For example, user interface 500 may include thousands of documents ranked based on similarity.

In various implementations, user interface 500 shows the degree of similarity between each document and the seed document. In this particular example, document DocID1 is the seed document. As such, user interface 500 shows 100% similarity. Documents DocID2 and DocID3 have 75.45% similarity. For example, each of documents DocID2 and DocID3 have text that is 75.45% similar to the selected section of text of document DocID1. Document DocID4 has 38.18% similarity. For example, document DocID4 has text that is 38.18% similar to the selected section of text of document DocID1.

In some implementations, user interface 500 may include color coding next to the listed documents, where the color coding indicates a level of similarity. For example, green color coding may indicate very similar (e.g., 95% or more, etc.), orange color coding may indicate high similarity (e.g., 80% or more, etc.), yellow color coding may indicate medium similarity (e.g., 50% or more, etc.). The particular colors used, and associated similarity thresholds may vary and will depend on the particular implementation. The color may be a bar next to the particular document, a coloring of the same of the document, etc. In some implementations, the system may generate a user interface with an option that allows the user to filter the documents to display documents associated with each color. For example, selecting the orange color may cause the user interface to display only the other documents that are associated with the high similarity.

In various implementations, the system stores the similarity information so that a user may find and retrieve relevant or similar documents quickly, on demand. In some implementations, the system may pre-fetch documents based similarity.

In some implementations, the system may provide a graphical user interface that includes, for each document of the plurality of documents, an option to view each document of the plurality of documents in a native format, a graphical format, a text format, a production format, a translated format, or an original format.

In some implementations, the user interface may include an option to provide a side-by-side comparison of one of the other documents with the seed document. The user interface may display the side-by-side comparisons for documents as a document comparison, a text comparison, or a TIFF comparison. The user interface may include an option to show markings to indicate how the documents are different, such as displaying the other document with highlighting to show text that was added as compared to the seed document, strikethrough to show text that was deleted as compared to the seed document, etc.

In some implementations, the system enables a user to redact one or more portions of the seed document. As indicated above, an HTML file enables a user to redact portions of a document. The system then automatically redacts one or more corresponding portions of one or more other documents. In some implementations, the system generates a user interface that includes a text field where a user may input text to be highlighted in the document. The user interface may also include an option to redact the highlighted text in the document.

For example, in some implementations, the system receives a redact request to redact a portion of the seed document while the seed document is displayed in a graphical format. In some implementations, the system highlights words in the seed document for which corresponding words in the other documents are to be identified for redaction. In some implementations, the system may provide a redact button for the user to select after text is highlighted. In some implementations, the system may suggest words or phrases for redaction based on artificial intelligence, such as machine learning that uses a training set to identify words or phrases that were previously considered to be privileged.

When the system redacts those words in the seed document, the system also automatically redacts one or more portions of a second document, where those portions of the second document correspond to the portions of the seed document indicated in the redact request. The system then provides the second document as a text document that omits text corresponding to the portions that was redacted.

In some implementations, user may redact portions of a document. For example, a user may redact a person's name based on privilege. The system may output the document in a TIFF file format. As a result, the system ensures that the recipient of the redacted file could not reverse engineer the file to identify the text that was redacted because the TIFF file is an image of the text instead of the text itself.

In some implementations, if a user receives a TIFF file from opposing counsel, the system may perform optical character recognition (OCR) in order to identify text, and then present the text to the user.

In some implementations, the system may provide translated text. The system may directly perform the translation, use third-party software to perform the translation, etc. The translation may be performed on text that was converted from an image (e.g., using OCR), on non-redacted text, on redacted text, etc. In some implementations, the system provides an option to display a comparison of the translated text with the original text.

Figure 6:
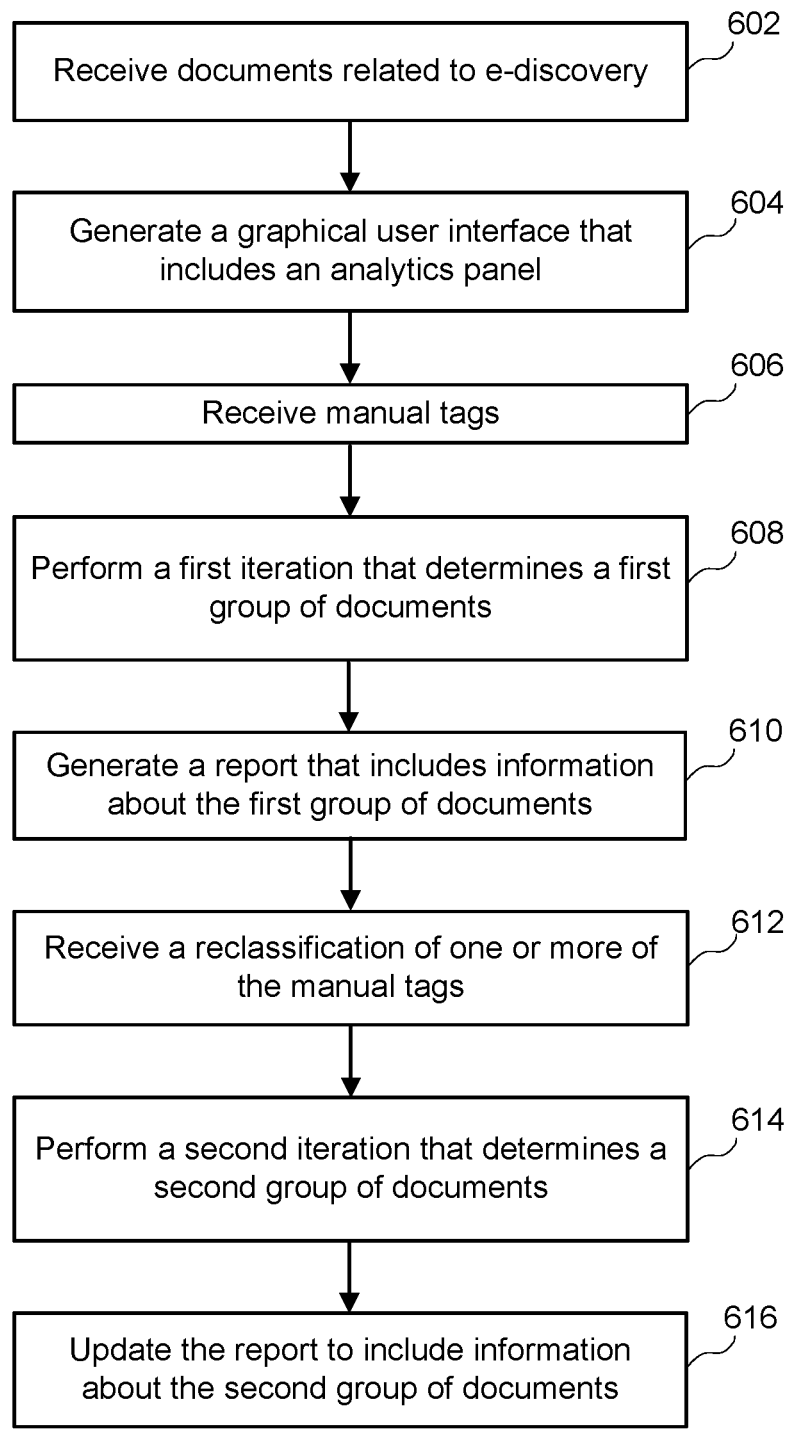
FIG. 6 illustrates an example flow diagram for performing document analytics, according to some implementations.

FIG. 6 illustrates an example flow diagram for performing document analytics, according to some implementations. In various implementations, the system performs analytics based on artificial intelligence. For example, the system may perform analytics based on metadata of the documents. As described in more detail herein, such graphics enable the user to create more search queries. Referring to FIG. 6, a method is initiated at block 602, where the system receives documents related to e-discovery. For example, as indicated herein, the documents may be owned by or otherwise associated with a party of a lawsuit, where the party may be an individual and/or a corporation and/or any legal entity such as a government organization. In various implementations, the system may receive a document from the cloud and/or from various third-party sources in the cloud (e.g., emails, social networks, etc.).

At block 604, the system generates a graphical user interface that includes an analytics panel. In various implementations, the analytics panel provides analytics information about the plurality of documents.

In some implementations, the analytics panel includes multiple views. For example, as described in more detail below, the analytics panel may include a bubble view showing information on the prevalence of words in the group of documents, and a timeline view showing information on emails. As shown in more detail below, the bubble view and timeline views present document information in a manner that enables a user to visually understand patterns in the documents.

Figure 7:
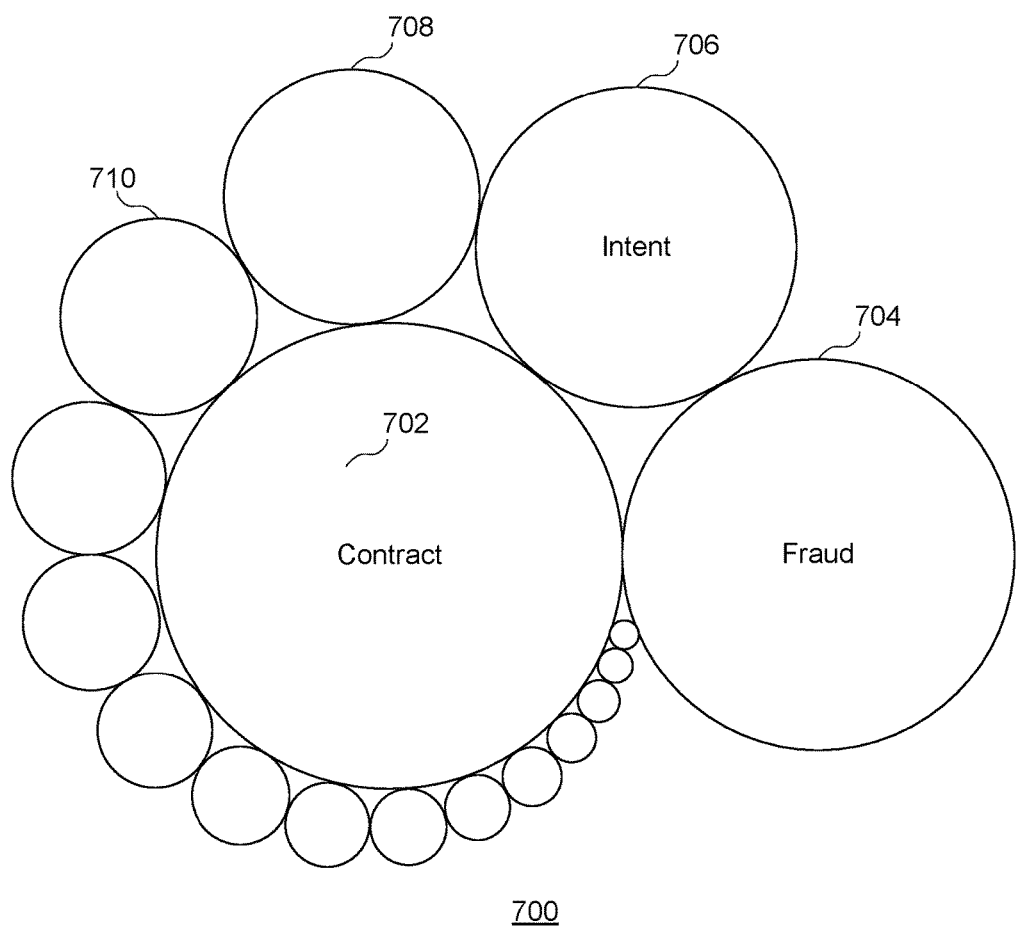
FIG. 7 illustrates example user interface displaying document analytics in graphical form, according to some implementations.

Turning to FIG. 7, example user interface 700 displaying document analytics in graphical form is illustrated, according to some implementations. In some implementations, user interface 700 may be used to represent a bubble view of the analytics panel. In some implementations, the analytics panel includes an option to generate a graphic such as user interface 700 that illustrates a predetermined number of words from the plurality of documents as objects. The system may provide options for defining different groups of the plurality of documents to be analyzed. For example, the system may generate an analytics panel that allows a user to perform a similarity search on the plurality of documents and then generate the graphic for a subset of the plurality of documents that exceed a predetermined threshold similarity value to a seed document.

In some implementations, the system determines a frequency of particular words in a group or family of documents, where the system associates a bubble with a word. In some implementations, the size of a given bubble is proportional to the frequency of the associated word. For example, bubble 702 is the largest bubble shown in user interface 700. As such, the word associated with bubble 702 is the most frequently occurring word in the group of documents.

In some implementations, a word may be shown in each bubble. In this particular example, bubble 702 is associated with the word, "contract." Bubble 704 is associated with the word, "fraud." Bubble 706 is associated with the word, "intent." The particular word associations will depend on the particular implementation. For ease of illustration, only three words are shown. In some implementations, a word is shown in each bubble. In some implementations, if a given word does not fit in a corresponding bubble, the system may display the word in as a pop-up when a user hovers a cursor over the corresponding bubble.

Bubble 704 is the second largest bubble shown in user interface 700. As such, the word associate with bubble 704 is the second most frequently occurring word in the group of documents. Bubble 706 is the third largest bubble shown in user interface 700. As such, the word associated with bubble 706 is the third most frequently occurring word in the group of documents. Bubble 708 is the fourth largest bubble shown in user interface 700. As such, the word associated with bubble 708 is the fourth most frequently occurring word in the group of documents. Bubble 710 is the fifth largest bubble shown in user interface 700. As such, the word associated with bubble 710 is the fifth most frequently occurring word in the group of documents.

This pattern of decreasing bubble sizes continues for a predetermined number of words. For ease of illustration, 17 bubbles are shown. Any predetermined number of bubbles is possible (e.g., 10 words, 15 words, 17 words, 20 words, 50 words, etc.). The specific predetermined number of words may vary and will depend on the particular implementation.

In some implementations, the predetermined number of words that the system analyzes for frequency may be based on keywords provided by a user. For example, in some implementations, the keywords may be keywords that a user provides in the analytics panel or user interface 700. In some implementations, the keywords may be keywords from the selected text of the seed document. In some implementations, the keywords may be keywords from legal issues selected and/or provided by a user.

In some implementations, the analytics panel includes an option to identify synonyms for words. In some implementations, the method further includes querying the plurality of documents for a subset of documents that match the words and the synonyms for the words. The system may generate the synonyms based on a document that defines synonyms. In some implementations, the system may query a third-party database for synonyms. In some implementations, the analytics panel may include an option for a user to define the synonyms. The system may use any combination of the above-describes methods to determine synonyms for the words.

For ease of illustration, each successive bubble is smaller than the previous. In other scenarios, two or more words may have the same number of instances. As such, the bubbles associated with those words may be the same size.

In some implementations, the bubbles may be color coded based on one or more predetermined color schemes. For example, in some implementations, the color of adjacent bubbles may vary in order to make the bubbles easier to read. In some implementations, the contrast of adjacent bubbles may vary in order to make the bubbles easier to read.

Figure 8:
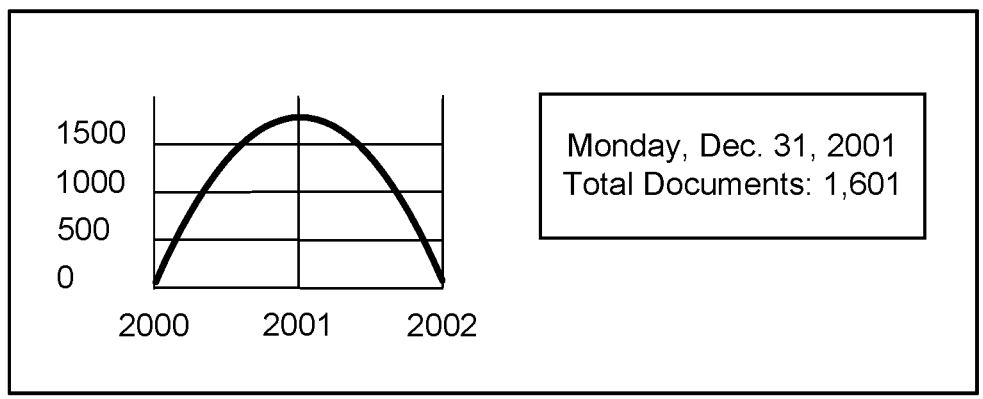
FIG. 8 illustrates example user interface displaying document analytics in graphical form, according to some implementations.

FIG. 8 illustrates an example user interface 800 displaying document analytics in graphical form, according to some implementations. In some implementations, user interface 800 may be used to represent a timeline view of a plurality of documents.

As shown, user interface 800 includes a graph having an x-axis and a y-axis. In various implementations, the x-axis is associated with a time period. The time period may be associated with a time of creation, a time of data transmission, a time of modification of the document, etc. For example, in the example in FIG. 8 the time represents the date that various emails were sent.

In some implementations, the analytics panel includes a first option to generate a graphic that illustrates a number of documents as a function of a date and a second option to generate the graphic based on a date range. For example, in some implementations, the system may enable a user to enter a start time and an end time. For example, in this particular example, the start time is a year (e.g., year 2000) and the end time is a year (e.g., year 2002). As shown, the x-axis includes the years 2000, 2001, and 2002. The time span may vary depending on the particular implementation, and the x-axis adjusts accordingly. For example, the start time and end time may be particular months (e.g., start time of February 2001 and end time of August 2001). In another example, the start time and end time may be particular dates (e.g., start time of 2/10/01 and end time of 4/17/02). The system may generate the date range automatically based on a group of documents selected for display by a user. In some implementations, the system may provide the user with an option for defining a date range.

In various implementations, the y-axis indicates a number of documents. As shown, the y-axis shows a range of numbers of documents from 0 to 1,601. More specifically, the number of documents started at 0 documents and increased in volume to 1,601 documents at the end of 2001 and then tapered back down to 0 documents at the end of 2002. In some implementations, user interface 800 may show the peak date and peak number of documents. For example, as shown, a total of 1,601 documents were sent on Monday, Dec. 31, 2001.

In various implementations, the system may enable a user to specify which documents to include for the results in user interface 800, where the system may enable the user to make such specifications in the analytics panel or in user interface 800. For example, the user interface may include all documents associated with a document discovery project. The user interface may include an option to filter the documents by emails, by person, by dates, by keywords, etc. The system may then display information about the filtered documents. In some implementations, the system may filter emails based on an email subject header. For example, the system may identify all emails that use "Employment Contract Sarah Smith" as part of the header for the subject line in order to encapsulate the email group that includes other terms in the email header, such as "Re."

In some implementations, the system uses artificial intelligence to categorize a group of documents. For example, the system may categorize a group of documents based on emails sent from a sender domain, and the analytics panel includes an option to generate a graphic that illustrates subsets of the sender domain as a function of a number of emails sent from each subset of the sender domain. In some implementations, the system may apply pattern recognition to the group of documents to identify interesting trends or unusual behavior in the emails. For example, the system may analyze emails associated with an insider trading litigation where the email traffic is relatively stable except for a time period where there is a hundredfold increase in the number of emails being sent. The system may generate a graphic that illustrates the time period where emails are sent on the x-axis and the number of emails on the y-axis and generates a graphic that summarizes information about the spike in the email traffic. In some implementations, the system may identify key events that are relevant to the litigation and provide a graphic that includes information about the key events to provide context for the user. Continuing with the example above, the system may identify on the x-axis that the spike in emails occurred a few days before information about a merger involving one of the parties to the lawsuit became public. As a result, the system may identify for the user emails that may include proof that people committed insider trading. As a result, the system may advantageously identify important information in the emails that would be difficult for a human to identify if the human is simply reviewing discrete documents because of the overwhelming amount of information associated with document discovery.

Turning back to FIG. 6, at block 606, the system receives from one or more users manual tags for one or more of the documents. In some implementations, the system uses artificial intelligence to compare the tagged documents to other documents in the documents related to e-discovery to identify patterns based on content and metadata. The metadata may include information associated with the document, such as a date of creation, a date of modification, a name of the file, a size of the file, a type of file (a Word document, a spreadsheet, a graphical image, etc.).

For example, the documents related to e-discovery may be associated with a litigation that includes both a claim for breach of contract and tortious interference with business relationships. The system may determine based on content in the documents that the pattern includes the user tagging documents as being associated with "contracts" when the documents include certain keywords, such as "sale" and "agreement." The system may also determine that the pattern includes the user tagging documents as being associated with "tortious interference with business relationships" when the documents include different keywords, such as "lawsuit." In another example, the system may determine based on metadata associated with the document that the pattern includes the user tagging documents created during a first time period as being associated with "contracts" and documents created during a second time period as being associated with "tortious interference of business relationships."

In some implementations, the system identifies statistics associated with the one or more users that provided manual tags for one or more of the plurality of documents. The system then generates a graphic that illustrates the statistics. In some implementations, the statistics may include at least one of a time to review each document and a quality of review.

At block 608, the system performs a first iteration that determines a first group of documents. The first group of documents may be improperly associated with one or more of the manual tags based on at least one of content and metadata of the plurality of documents. Continuing with the example above, the system may determine that the user failed to follow the pattern in tagging the first group of documents. For example, the user may have tagged a document as being associated with the legal issue "contracts" when the document includes the term "lawsuit." In another example, the user may have tagged a document as being associated with the legal issue "tortious interference with business relationships" when the document was created during the time period associated with documents that, based on the pattern, are typically tagged as being associated with the legal issue "contracts." In some implementations, the first group of documents may be documents that are not associated with a tag (i.e., unclassified documents).

In some implementations, to perform iteration analysis, the system utilizes two types of tags or categories (e.g., responsive or nonresponsive tags, and privileged or non-privileged tags). In some implementations, the system generates a training set with the two categories. The system may perform N-fold cross validation in order to ensure that comparisons are correct. In order to maintain training quality control, the system may identify categories flagged as possibly incorrect or uncategorized. The system then performs the first iteration, and automatically classifies the documents based on the training set.

At block 610, the system generates a report that includes information about the first group of documents. In some implementations, the first group of documents includes documents that are not associated with a tag. The system may generate suggestions for how to classify the documents in the first group. For example, the system may suggest that the documents in the first group that are improperly associated with "contracts" should be associated with "tortious interference with business relationships," the documents that are improperly associated with "tortious interference with business relationships" should be associated with "contracts," and documents that are not associated with a tag should be associated with either "contracts" or "tortious interference with business relationships."

At block 612, the system receives, from the one or more users, a reclassification of one or more of the manual tags. For example, the user may accept the suggestions provided in the previous paragraph or the user may make manual changes to the tags.

At block 614, the system performs a second iteration that determines a second group of documents that are improperly associated with one or more of the manual tags based on the reclassification. The second iteration may be based on user feedback. In some implementations, the second iteration may be performed on the remaining documents. In some implementations, the system may perform the second iteration by reanalyzing all the documents or reanalyzing any document changed by the user as part of the user feedback and all documents from the first group of documents. In various implementations, the first group of documents includes different manual tags from the second group of documents. For example, based on user feedback the system may modify the pattern and, as a result, identify manual tags that the system previously thought were appropriate that are now possibly wrong.

At block 616, the system updates the report to include information about the second group of documents. In some implementations, the system, further identifies a group of documents from the group of documents that are irrelevant based on a determination that a file type for the group of documents corresponds to a nonresponsive attachment. For example, the nonresponsive attachment may be an attachment that is not a useful document such as a Word document, but is instead associated with spam or unhelpful information, such as an automatically generated jpeg that is part of the author's signature.

In some implementations, the system continues to perform iterations after receiving user feedback until the group of documents does not substantially change between iterations. For example, the method 600 may be performed on 1000 documents related to e-discovery. The user may provide manual tags for 500 of the documents. The system may determine that 100 of the 500 documents that were improperly tagged. The system may provide suggestions for tagging 400 of the remaining 500 unclassified documents. The user may provide feedback by accepting or rejecting the identification of the 100 improperly tagged documents and accepting 100 of the suggestions for tagging 400 of the remaining 500 unclassified documents. The system may perform a second iteration that identifies 50 documents that were improperly tagged and provides suggestions for tagging 300 of the remaining 400 unclassified documents. The user may provide user feedback that changes only one of the 50 documents that were identified as being improperly tagged and accepts only one of the suggestions for tagging 300 of the remaining 400 unclassified documents. The system may perform a third iteration and determine that the different between the third iteration and the second iteration is minimal enough that a fourth iteration should not be performed.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations described herein provide various benefits. For example, implementations enable a user to search for documents having similar portions or text. Implementations described herein also enable a user to quickly and conveniently redact the same portions or text from multiple documents. Implementations described herein provide document analytics for a user.

Figure 9:
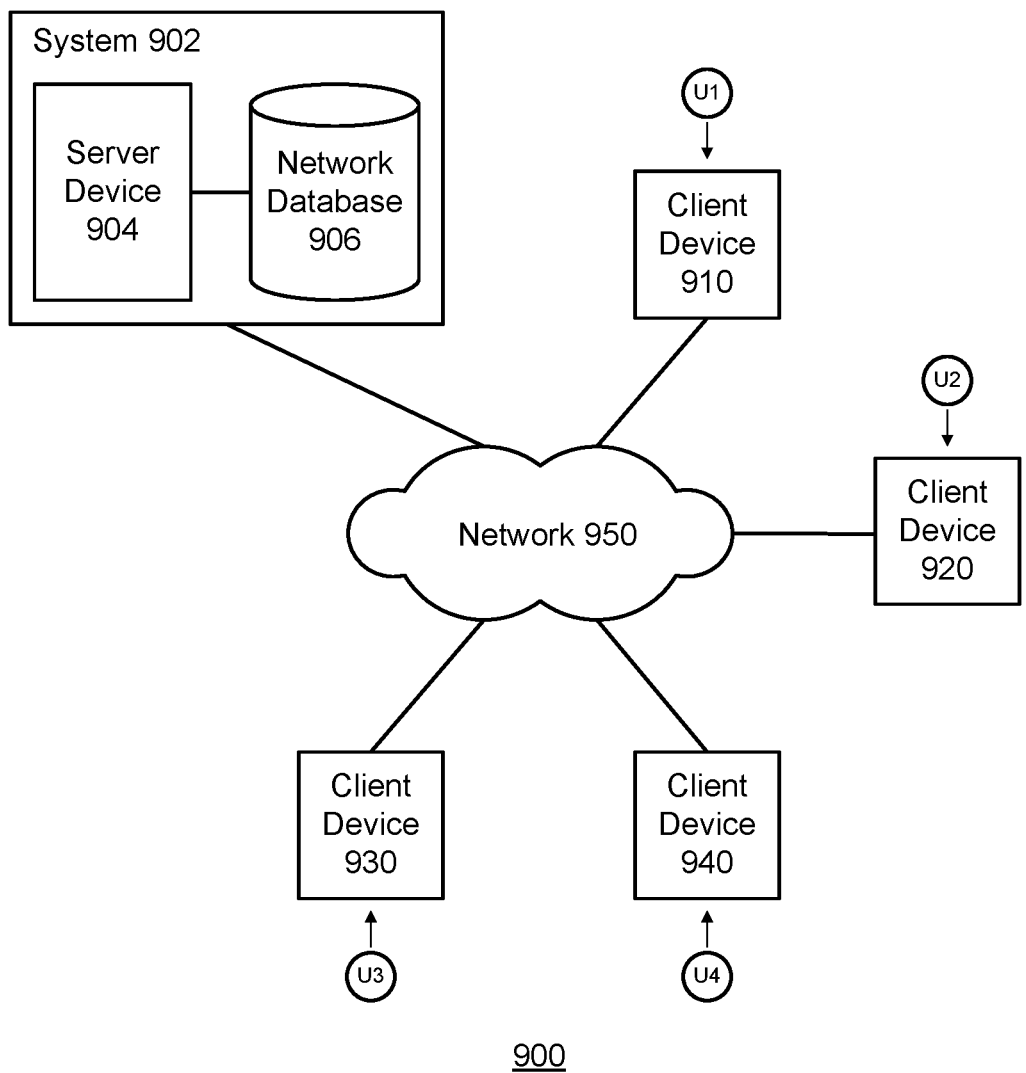
FIG. 9 illustrates a block diagram of an example network environment, which may be used for some implementations described herein.

FIG. 9 illustrates a block diagram of an example network environment 900, which may be used for some implementations described herein. In some implementations, network environment 900 includes a system 902, which includes a server device 904 and a network database 906. Network environment 900 also includes client devices 910, 920, 930, and 940, which may communicate with each other directly or via system 902. Network environment 900 also includes a network 950.

For ease of illustration, FIG. 9 shows one block for each of system 902, server device 904, and network database 906, and shows four blocks for client devices 910, 920, 930, and 940. Blocks 902, 904, and 906 may represent multiple systems, server devices, and network databases. Also, there may be any number of client devices. In other implementations, network environment 900 may not have all of the components shown and/or may have other elements including other types of elements instead of, or in addition to, those shown herein. In various implementations, users U1, U2, U3, and U4 may interact with each other or with system 902 using respective client devices 910, 920, 930, and 940.

In the various implementations described herein, a processor of system 902 and/or a processor of any client device 910, 920, 930, and 940 causes the elements described herein (e.g., information, etc.) to be displayed in a user interface on one or more display screens.

Implementations may apply to any network system and/or may apply locally for an individual user. For example, implementations described herein may be implemented by system 902 and/or any client device 910, 920, 930, and 940. System 902 may perform the implementations described herein on a stand-alone computer, tablet computer, smartphone, etc. System 902 and/or any of client devices 910, 920, 930, and 940 may perform implementations described herein individually or in combination with other devices.

Figure 10:
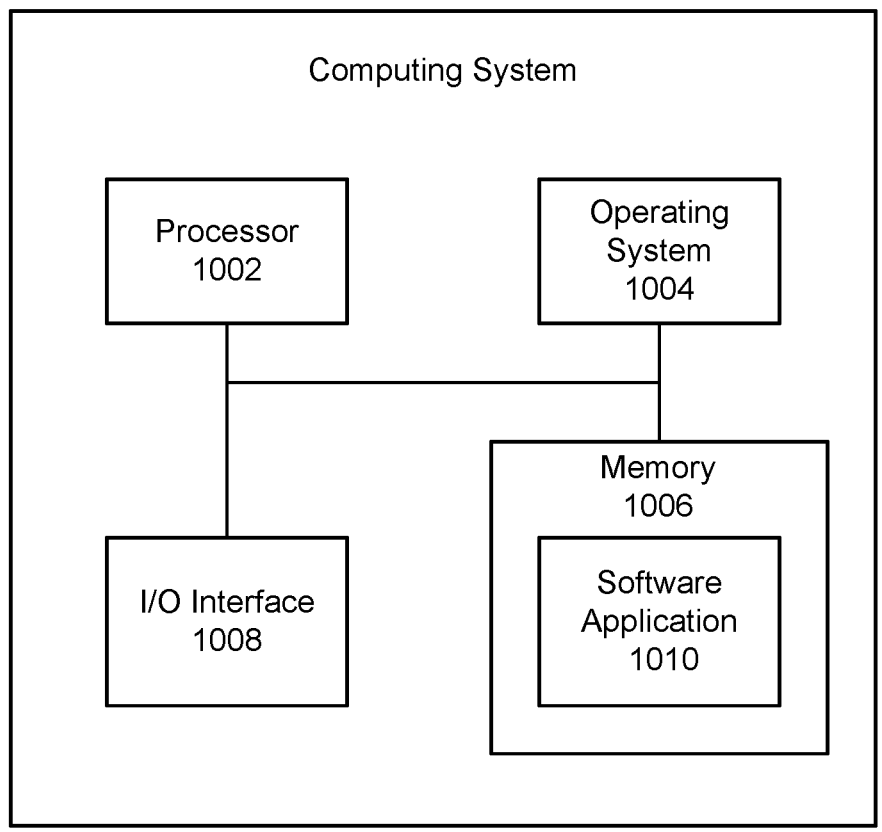
FIG. 10 illustrates a block diagram of an example computing system, which may be used for some implementations described herein.

FIG. 10 illustrates a block diagram of an example computing system 1000, which may be used for some implementations described herein. For example, computing system 1000 may be used to implement server device 904 of FIG. 9, as well as to perform the method implementations described herein. In some implementations, computing system 1000 may include a processor 1002, an operating system 1004, a memory 1006, and an input/output (I/O) interface 1008. In various implementations, processor 1002 may be used to implement various functions and features described herein, as well as to perform the method implementations described herein. While processor 1002 is described as performing implementations described herein, any suitable component or combination of components of computing system 1000 or any suitable processor or processors associated with computing system 1000 or any suitable system may perform the steps described. Implementations described herein may be carried out on a user device, on a server, or a combination of both.

Computing system 1000 also includes a software application 1010, which may be stored on memory 1006 or on any other suitable storage location or computer-readable medium. Software application 1010 provides instructions that enable processor 1002 to perform the implementations described herein and other functions. Software application may also include an engine such as a network engine for performing various functions associated with one or more networks and network communications. The components of computing system 1000 may be implemented by one or more processors or any combination of hardware devices, as well as any combination of hardware, software, firmware, etc.

For ease of illustration, FIG. 10 shows one block for each of processor 1002, operating system 1004, memory 1006, I/O interface 1008, and software application 1010. These blocks 1002, 1004, 1006, 1008, and 1010 may represent multiple processors, operating systems, memories, I/O interfaces, and software applications. In various implementations, computing system 1000 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software encoded is in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, system, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmed general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A method comprising:
   receiving a plurality of documents related to e-discovery;
   determining a seed document from the plurality of documents;
   receiving a search request to search at least one selection of text in the seed document;
   identifying other documents from the plurality of documents based on a similarity between text in the other documents and the at least one selection of text in the seed document; and
   generating a graphical user interface that includes a similarity panel that provides similarity data between text in the other documents and the at least one selection of text in the seed document;
   wherein the similarity panel provides:
      a first number of the other documents having text that is identical to the at least one selection of text in the seed document based on a first predetermined similarity threshold;
      a second number of the other documents having text that is similar to the at least one selection of text in the seed document based on a second predetermined similarity threshold; and
      an option to search for a subset of the other documents based on a similarity percentage between the at least one selection of text in the seed document and text in the other documents.

2. The method of claim 1, further comprising:
   receiving a similarity request to identify the other documents having text that is similar to the at least one selection of text in the seed document; and
   identifying the other documents having text that is similar to the at least one selection of text in the seed document.

3. The method of claim 1, wherein the identifying of the other documents is based on the similarity between the at least one selection of text in the seed document and text in the other documents which includes using pattern recognition.

4. The method of claim 1, wherein the graphical user interface includes a list of one or more legal issues to associate with any one or more documents of the plurality of documents.

5. The method of claim 1, further comprising:
   associating one or more legal issues with the seed document;
   associating one or more other documents with the one or more legal issues associated with the seed document;
   receiving a filter request that includes the one or more legal issues; and
   filtering one or more other documents from the plurality of documents based on the filter request.

6. The method of claim 1, wherein the graphical user interface includes, for each document of the plurality of documents, an option to view each document of the plurality of documents in a native format, a graphical format, a text format, a production format, a translated format, or an original format.

7. The method of claim 1, further comprising:
enabling a user to redact one or more portions of the seed document; and
automatically redacting one or more corresponding portions of one or more other documents.

8. A non-transitory computer-readable storage medium carrying program instructions thereon, the instructions when executed by one or more processors cause the one or more processors to perform operations comprising:
receiving a plurality of documents related to e-discovery;
determining a seed document from the plurality of documents;
receiving a search request to search at least one selection of text in the seed document;
identifying other documents from the plurality of documents based on a similarity between text in the other documents and the at least one selection of text in the seed document; and
generating a graphical user interface that includes a similarity panel that provides similarity data between text in the other documents and the at least one selection of text in the seed document;
wherein the similarity panel provides:
a first number of the other documents having text that is identical to the at least one selection of text in the seed document based on a first predetermined similarity threshold;
a second number of the other documents having text that is similar to the at least one selection of text in the seed document based on a second predetermined similarity threshold; and
an option to search for a subset of the other documents based on a similarity percentage between the at least one selection of text in the seed document and text in the other documents.

9. The computer-readable storage medium of claim 8, wherein the instructions when executed further cause the one or more processors to perform operations comprising:
receiving a similarity request to identify the other documents having text that is similar to the at least one selection of text in the seed document; and
identifying the other documents having text that is similar to the at least one selection of text in the seed document.

10. The computer-readable storage medium of claim 8, wherein the identifying of the other documents is based on the similarity between the at least one selection of text in the seed document and text in the other documents which includes using pattern recognition.

11. The computer-readable storage medium of claim 8, wherein the graphical user interface includes a list of one or more legal issues to associate with any one or more documents of the plurality of documents.

12. The computer-readable storage medium of claim 8, wherein the instructions when executed further cause the one or more processors to perform operations comprising:
associating one or more legal issues with the seed document;
receiving a filter request that includes the one or more legal issues; and
filtering one or more other documents from the plurality of documents based on the filter request.

13. The computer-readable storage medium of claim 8, wherein the graphical user interface includes, for each document of the plurality of documents, an option to view each document of the plurality of documents in a native format, a graphical format, a text format, a production format, a translated format, or an original format.

14. The computer-readable storage medium of claim 8, wherein the instructions when executed further cause the one or more processors to perform operations comprising:
enabling a user to redact one or more portions of the seed document; and
automatically redacting one or more corresponding portions of one or more other documents.

15. A system comprising:
one or more processors; and
logic encoded in one or more non-transitory computer-readable media for execution by the one or more processors and when executed operable to perform operations comprising:
receiving a plurality of documents related to e-discovery;
determining a seed document from the plurality of documents;
receiving a search request to search at least one selection of text in the seed document;
identifying other documents from the plurality of documents based on a similarity between text in the other documents and the at least one selection of text in the seed document; and
generating a graphical user interface that includes a similarity panel that provides similarity data between text in the other documents and the at least one selection of text in the seed document;
wherein the similarity panel provides:
a first number of the other documents having text that is identical to the at least one selection of text in the seed document based on a first predetermined similarity threshold;
a second number of the other documents having text that is similar to the at least one selection of text in the seed document based on a second predetermined similarity threshold; and
an option to search for a subset of the other documents based on a similarity percentage between the at least one selection of text in the seed document and text in the other documents.

16. The system of claim 15, wherein the logic when executed is further operable to perform operations comprising:
receiving a similarity request to identify the other documents having text that is similar to the at least one selection of text in the seed document; and
identifying the other documents having text that is similar to the at least one selection of text in the seed document.

17. The system of claim 15, wherein the identifying of the other documents is based on the similarity between the at least one selection of text in the seed document and text in the other documents which includes using pattern recognition.

18. The system of claim 15, wherein the graphical user interface includes a list of one or more legal issues to associate with any one or more documents of the plurality of documents.

19. The system of claim 15, wherein the logic when executed is further operable to perform operations comprising:
- associating one or more legal issues with the seed document;
- receiving a filter request that includes the one or more legal issues; and
- filtering one or more other documents from the plurality of documents based on the filter request.

20. The system of claim 15, wherein the graphical user interface includes, for each document of the plurality of documents, an option to view each document of the plurality of documents in a native format, a graphical format, a text format, a production format, a translated format, or an original format.

* * * * *